United States Patent [19]

Brow

[11] 4,284,066
[45] Aug. 18, 1981

[54] SOLAR LIQUID HEATER

[76] Inventor: Robert J. Brow, 1843 N. Jefferson, Hobbs, N. Mex. 88240

[21] Appl. No.: 156,366

[22] Filed: Jun. 4, 1980

[51] Int. Cl.³ .............................................. F24J 3/02
[52] U.S. Cl. .................................. 126/435; 126/437; 126/450
[58] Field of Search .............. 126/400, 449, 450, 437, 126/430, 435, 434, 436

[56] References Cited

U.S. PATENT DOCUMENTS

| 2,553,073 | 5/1951 | Barnett | 126/437 |
|---|---|---|---|
| 2,680,437 | 6/1954 | Miller | 126/432 |
| 3,919,998 | 11/1975 | Parker | 126/435 |
| 4,061,129 | 12/1977 | Wilson | 126/436 |
| 4,068,652 | 1/1978 | Worthington | 126/430 |
| 4,084,578 | 4/1978 | Ishibashi | 126/437 |
| 4,135,490 | 1/1979 | Soleau | 126/435 |
| 4,165,735 | 8/1979 | Smith | 126/437 |
| 4,172,442 | 10/1979 | Boblitz | 126/400 |
| 4,213,448 | 7/1980 | Hebert | 126/436 |
| 4,250,871 | 2/1981 | Milburn | 126/436 |

FOREIGN PATENT DOCUMENTS 257348  10/1948  Switzerland .............. 126/435

Primary Examiner—Daniel J. O'Connor
Attorney, Agent, or Firm—Warren F. B. Lindsley

[57] ABSTRACT

A solar liquid heater employing a solar absorber flat plate collector combined in a self-contained unit with an integral liquid storage tank insulated to prevent reversible heat flow and embodying an air flow path over the top of the collector, around the liquid storage tank, across the bottom of the collector and again back across the top of the collector in a closed loop path.

10 Claims, 6 Drawing Figures

SOLAR LIQUID HEATER

BACKGROUND OF THE INVENTION

In recent years, the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

Flat plate solar collectors with air and/or fluid flow grooves and tubes have been known with one known flat plate collector being described in the *World Book Encyclopedia*, (copyrighted 1963 ). This encyclopedia describes the flat plate collector as being made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate acts as a heat trap, letting in the sun's rays but keeping most of the heat from escaping again.

A major disadvantage of the known flat plate collectors is that they need auxiliary apparatus to function as a system, i.e., they are not self contained. To be self contained and function as a system, the flat collector must embody an integral liquid storage reservoir embodied in an effective insulated enclosure and it must be kept insulated and isolated from any opportunity to radiate heat to the atmosphere or associated lower temperature bodies.

Even though the known flat plate collectors are efficient in collecting solar energy and are very simple and inexpensive to construct, they have not been developed to their full potential.

DESCRIPTION OF THE PRIOR ART

Although the flat plate collector has been known, the invention disclosed herein comprises a marriage of the flat plate collector with a self contained integral hot liquid storage reservoir which is designed and insulated to prevent reversible heat flow all not known to have existed in the prior art.

Swiss Pat. No. 257,348 discloses a solar water heater comprising a hollow casing having an absorber plate located centrally therewithin defining a circular flow path in which the air is circulated over a U-shaped pipe arrangement. One end of the U-shaped pipe is connected to an inlet and the other end is connected to an outlet.

U.S. Pat. No. 4,135,490 discloses a solar energy collector comprising an insulating hollow casing having an absorber plate and an air separator plate located centrally within to define a circular air flow path. At one end of the casing is located a finned heat exchanger through which water passes. The air flows between the fins and around the heat exchanger heating the water.

U.S. Pat. No. 3,919,998 discloses a convection type solar heating unit which employs a closed circuit for air movement in series through a flat plate collector and a separate water pre-heater tank.

U.S. Pat. No. 2,680,437 discloses a solar heat trap wherein air is heated by sunlight to a predetermined temperature with or without recirculation of air. The device is combined with heat storage in a water tank or gravel bed.

SUMMARY OF THE INVENTION

In accordance with the invention disclosed, a new and improved solar collector is provided in which a solar absorber flat plate collector is combined in a self-contained unit with an integral hot liquid storage tank or reservoir insulated to prevent reversible heat flow to more effectively use and store the heat absorbed by the collector plate.

It is, therefore, one object of this invention to provide an improved solar energy collector.

Another object of this invention is to provide a compact and inexpensive collector embodying a flat plate collector and integral hot liquid storage tank designed and well insulated to prevent reversible heat flow from the liquid in the tank.

A further object of this invention is to combine a solar flat plate collector in which air movement is controlled in a closed path through temperature gradients.

A still further object of this invention is to provide a new and improved solar liquid heater employing a self-contained liquid storage tank that may be positioned in a number of lateral positions to the horizontal and remain functional.

A still further object of this invention is to provide an efficient solar liquid heater than involves no moving parts and is functional in any climate.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
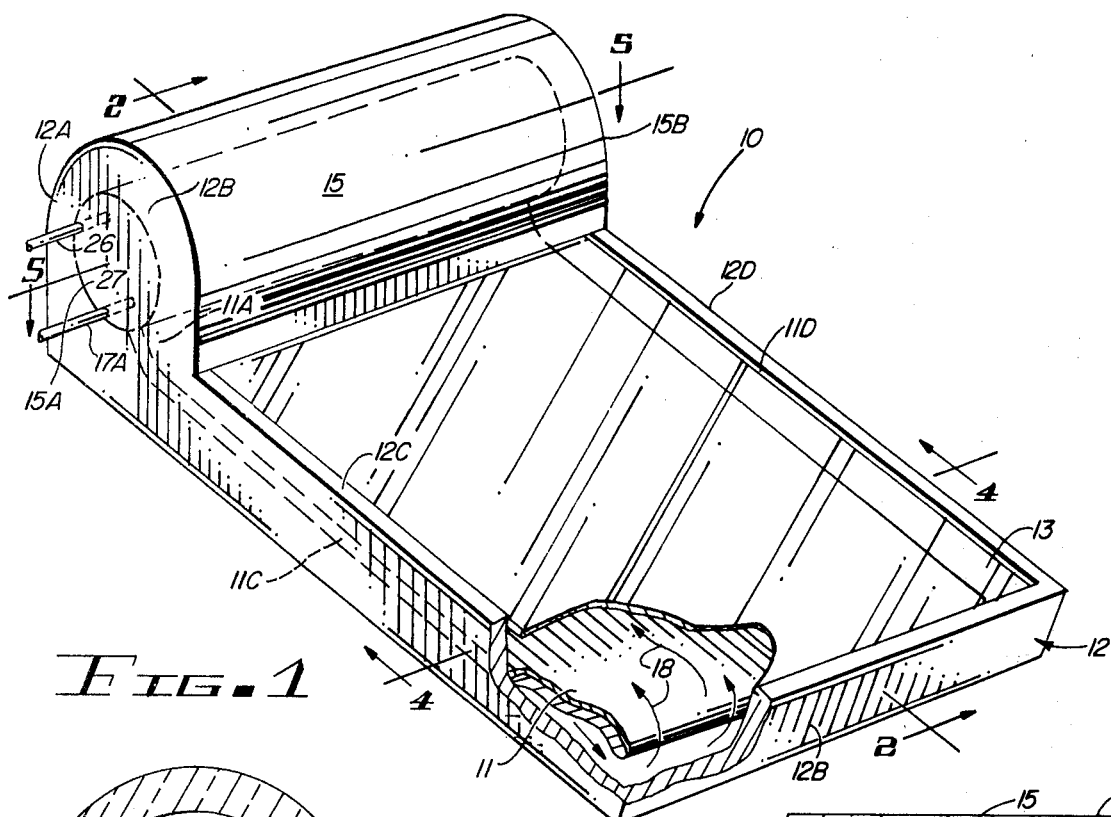
FIG. 1 is a perspective view of a solar liquid heater employing a self-contained hot liquid storage tank and embodying the invention.
Figure 2:
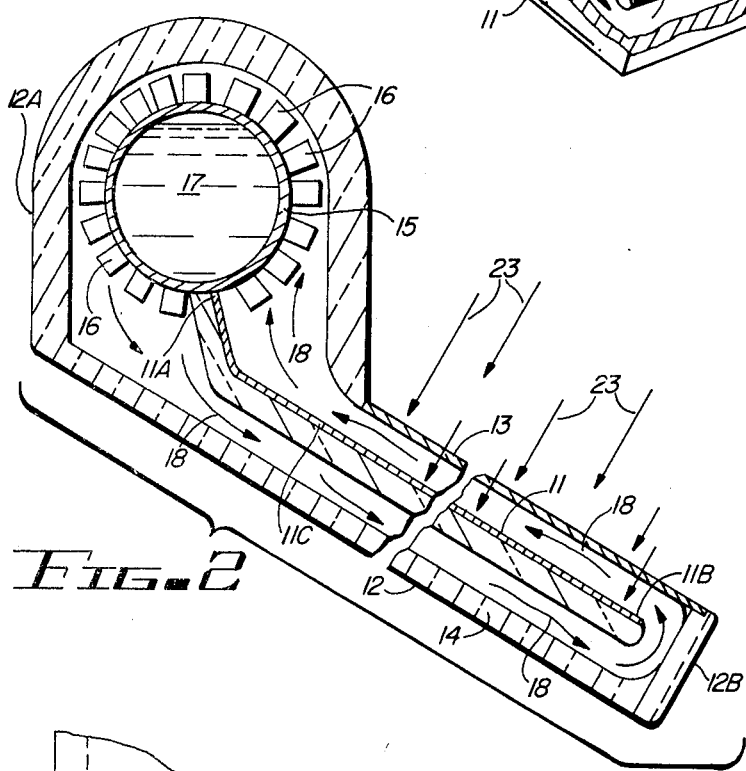
FIG. 2 is a cross-sectional view of FIG. 1 taken along the line 2—2.

Referring more particularly to the drawing by characters of reference, FIGS. 1 and 2 disclose a collector 10 of solar energy which when exposed to solar radiation, increases in temperature until its heat losses become equal to its heat gain. The losses depend on the emission of radiation by the heated material, the movement of the surrounding colder air, and the thermal conductivity of the material in contact with it. The gains depend on the intensity of solar radiation and the absorptivity of solar radiation by its surface.

Solar collectors are conveniently classified as flat-plate collectors, which do not focus, and as focusing collectors. The flat plate collectors are usually stationary but may be moved periodically to follow the season; the focusing collectors are usually turned throughout the day to follow the sun. The flat plate collectors are generally cheaper and they use heat from the diffuse solar radiation as well as from the direct radiation and can operate on bright cloudy days. The focusing collectors can use only the direct radiation but can produce much higher temperatures.

In both types of collectors, the receiving surface should be as black as possible to absorb over 95 percent of the radiation and reflect only a negligible amount.

The large flat plate solar receivers are made of sheet metal, usually iron, copper or aluminum, to give good heat conduction. The surfaces are blackened with dull paint which often contains carbon black, or they are covered with a black coating produced chemically.

The plate absorbing the radiation rises in temperature and transfers the heat to a fluid, usually air flowing thereacross. At the same time, the heated collector wastes heat to the surroundings by convection to moving air currents, by conduction to the air and to colder parts of the structure which holds the receiver, and by infrared radiation. At temperatures of 100° to 300° C., the maximum emission of radiation occurs around 8 to 10$\mu$ in the infrared, so the loss of heat is greatly decreased and the operating temperature of the collector increased by placing one or more sheets of glass or plastic over the black receiving surface in an airtight box. Sunlight with wavelengths of less than 2.5$\mu$ passes through these transparent coverings but the long wavelength infrared radiation emitted by the heated receiver does not pass back through the glass or plastic cover because it is absorbed.

The solar flat plate collector may be vertically positioned or tilted with the collection of solar heat varying depending on the size of the collector and the latitude and season of the year. Although horizontal collectors are the easiest to construct and mount and the most unobtrusive in appearance, collectors tilted toward the equator collect a greater fraction of the solar heat.

As disclosed in FIGS. 1 and 2, solar collector 10, which is tilted toward the sun, comprises, for purposes of illustration, a flat absorber plate 11 formed of any suitable material mounted within a suitable, usually insulating, frame 12 of plastic, wood or metal which may be covered with one or more suitable solar admittable sheets 13 of glass, plastic or the like to cover the absorber plate 11. The back of frame 12 may be covered or formed by any suitable non-conductive insulating airtight material 14 since it is not generally exposed to the sun's rays.

A liquid storage tank 15 is mounted within frame 12 at the end elevated from the horizontal which may or may not contain fins 16 radially positioned around at least a part of its outer periphery. Tank 15 contains the fluid such as, for example, water 17 to be heated by the sun's rays absorbed by the absorber plate 11.

As noted from FIGS. 1 and 2 of the drawing, the absorber plate 11 is spacedly positioned in frame 12 between its back 14 and cover 13 with one end 11A thereof conductively connected to the outer surface of the storage tank 15 which may be formed out of a heat conductive material. The other end 11B of the absorber plate 11 is spacedly positioned from end 12B of frame 12.

The sides 11C and 11D of the absorber plate 11 engage the juxtapositioned sides 12C and 12D of frame 12 thereby dividing the interior of the frame into two compartments, i.e., one above the top surace of the absorber plate and the other below the bottom surface of the absorber plate.

The liquid storage reservoir or tank 15 is mounted within an enlarged end 12A of frame 12 to extend laterally across the longitudinal axis of the solar collector 10 with its relatively flat ends 15A and 15B engaging the sides 12C and 12D of frame 12. In this manner, an air flow path illustrated by arrows 18 define a closed looped air path extending across the top of the absorber plate 11, counterclockwise around the outer periphery of tank 15, as shown in FIG. 2, along the bottom surface of the absorber plate 11 and around its end 11B to complete the closed looped path.

Since tank 15 is integral with and closely conforms to the inside surface of end 12A of frame 12, the depth of the air path around it is narrow with the insulation of end 12A of the frame insulating the tank from the atmosphere when it is storing its hot liquid content such as at night or on cloudy days when the sun is not shining on its absorber plate.

The tank is well insulated by the thickness of the frame around it in addition to the fact that on cloudy days and at night, there is no air flow around the tank inside of the frame because there is then substantially no temperature differential of the air in the collector. Further, since hot air rises, the air around tank 15 is hot and stagnant at night and on cloudy days thereby further insulating the outside of the tank with warm or hot air. This feature reduces loss of collected heat in the tank by conduction of the air around the tank.

Figure 4:
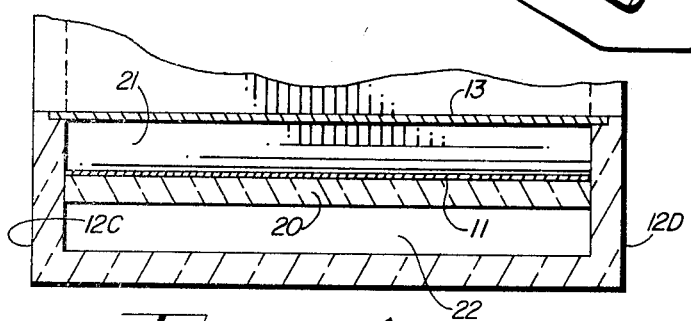
FIG. 4 is a cross-sectional view of FIG. 1 taken along the line 4—4.
Figure 5:
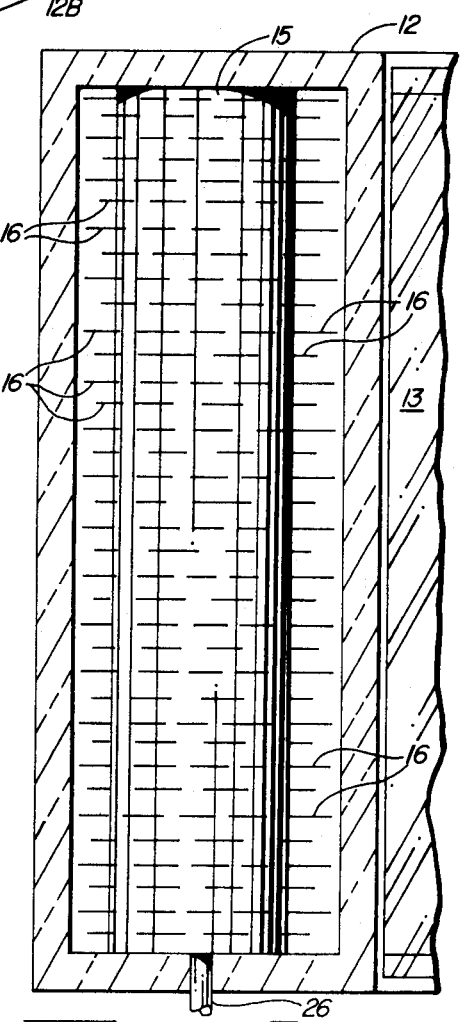
FIG. 5 is a cross-sectional view of FIG. 1 taken along the line 5—5.

As shown in FIGS. 2 and 4, a layer of insulating material 20 which is secured to the sides 12C and 12D of the frame may serve as the support of absorber plate 11 as well as insulate its lower surface so as to increase the temperature gradient of the air in the passageways 21 and 22 above and below the absorber plate 11.

Thus, as the top of absorber plate 11 receives solar rays represented by arrows 23 and absorbs heat therefrom, the absorber plate heats up warming the air above it. Since hot air rises, the air moves upwardly in the collector toward the storage tank 15 where it moves around the tank and its fins 16, if it has them, heating the fins and/or the outer surface of the tank. The fluid in the tank, i.e., water 17 transmitted thereto through inlet and outlet ports 17A and 17B is then heated by conduction of the heated inner surface of the tank. As the air cools in moving around the outer periphery of the tank, it becomes heavier flowing down and around the back side of tank 15 and into the passageway 22 below the insulating plate 20 and around end 11B of the absorber plate to the passageway 21 above the absorber plate. This closed circuit air flow continues until the sun rays no longer are received and heat the top surface of the absorber plate. At this time, the air flow stops and with it the natural convective forces that would permit the collected heat energy to escape to the atmosphere. The stagnant portion of the air around tank 15 insulates it together with end 12A of frame 12 from the atmosphere.

As noted, there are no moving parts in this collector except liquid such as, for example, water moving in and out of tank 15. The connection of end 11A of the absorber plate 11 to the outer surface of the tank isolates passageway 21 from passageway 22 at this point. Further, if the outer surface of tank 15 is conductive, the absorber plate 11 further heats the outer surface of the tank by conduction as well as by convection of the air heated by its upper surface.

Figure 3:
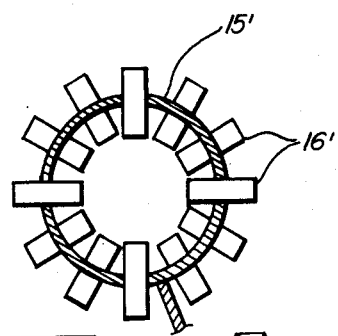
FIG. 3 is a cross-sectional view of a modification of the finned storage tank configuration shown in FIGS. 1 and 2.

FIG. 3 illustrates a modification of tank 15 of FIG. 1 wherein fins 16' of tank 15' are arranged to extend within the interior of the tank to aid in heating the water or fluid therein by conduction.

It should be noted that to be effective, solar collector 10 should be mounted laterally with respect to the horizontal with end 12A of frame 12 elevated above its end 12B. This arrangement makes it possible for the hot air heated above absorber plate 11 to move around the outer periphery of tank 15 where it is cooled and forced by the further movement of hot air behind it around tank 15 and through passageway 22 around end 11B of the absorber plate and back again over its top surface where it is again reheated if the solar rays are still striking its top surface.

Figure 6:
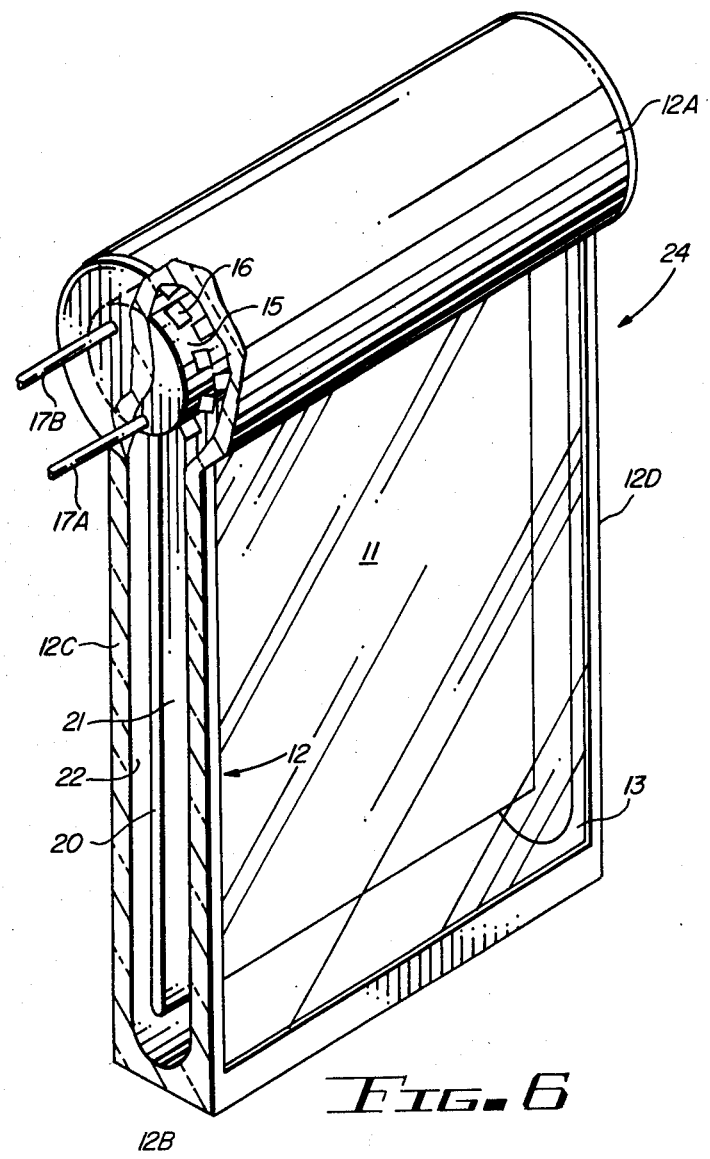
FIG. 6 is a perspective view of a modification of the solar liquid heater shown in FIG. 1.

FIG. 6 illustrates a modification of the solar collector shown in FIGS. 1, 2, 4 and 5 wherein like parts are provided with the same reference characters. Solar collector 24 shown in these figures differs from solar collector 10 in that the housing 12A is cylindrical in shape protruding equally outwardly from the front and back of the absorber plate 11.

This particular design configuration results in the non-reversible characteristic of the collector since it is positioned in a vertical position.

In accordance with the invention claimed, a solar collector or converter is disclosed which heats the liquid in the insulated storage tank embodied in the collector without the use of pumps or moving parts in an extremely effective manner. The disclosed structure is not only aesthetically pleasing in appearance, but may be embodied in the construction of a home, trailer or the like resulting in a virtually maintenance free utility.

Although but a few embodiments of the invention have been illustrated and described, it will be apparent to those skilled in the art that various changes and modifications may be made therein without departing from the spirit of the invention or from the scope of the appended claims.

What is claimed is:

1. A flat plate solar energy converter comprising:
   an insulating housing having a top plate formed of suitable solar transparent material for transmitting solar rays into said housing,
   a solar ray absorber mounted within said housing adjacent said plate and arranged to extend longitudinally thereof for receiving the solar rays,
   a liquid storage tank arranged in said housing at one end of said absorber,
   one end of said absorber being connected along its length to the outer periphery of said tank,
   said absorber being mounted in said housing to define between said plate and the top of said absorber an air flow passageway,
   said housing being form-fitted with insulating material to closely surround said tank to define a part of said air flow passageway between said tank and the interior periphery of said housing,
   said passageway defines an air flow in said housing along the top surface of said absorber and around at least a part of the outer periphery of said tank,
   whereby solar rays absorbed by the top surface of said absorber will heat the air juxtapositioned thereto, which heated air will flow in said part of said passageways around at least a part of the outer periphery of said tank for heating the liquid therein.

2. A flat plate solar energy converter comprising:
   a closed insulating housing having a top plate formed of suitable solar transparent material for transmitting solar rays into said housing,
   a solar ray absorber mounted within said housing adjacent said plate and arranged to extend longitudinally thereof for receiving the solar rays,
   a liquid storage tank arranged in said housing at one end of said absorber,
   said housing being form fitted with insulating material to closely surround said tank to define a first part of an air flow passageway between said tank and the interior periphery of said housing,
   one end of said absorber being connected along its length to the outer periphery of said tank,
   said absorber being mounted in said housing to define a second and third part of said air flow passageway interconnected by said first part with one part positioned below and another part positioned above the top surface of said absorber,
   said passageway defining an air flow channel in said housing along the top surface of said absorber and around said other end of said absorber and said tank in a closed loop path,
   whereby solar rays absorbed by the top surface of said absorber will heat the air juxtapositioned thereto which heated air will flow in said passageway around the outer periphery of said tank for heating the liquid therein.

3. The flat plate solar energy converter set forth in claim 2 wherein:
   the longitudinal axis of said tank is arranged to extend laterally across the longitudinal axis of said absorber.

4. The flat plate solar energy converter set forth in claim 2 wherein:
   said tank is provided with a plurality of heat absorbing fins arranged to extend laterally and outwardly of its outer periphery.

5. The flat plate solar energy converter set forth in claim 2 wherein:
   said housing is formed with a cylindrical configuration at its end surrounding said tank,
   the outer periphery of said tank and the inside periphery of said housing defining a narrow opening for said channel around said tank.

6. The flat plate solar energy converter set forth in claim 2 wherein:
   the longitudinal axis of said tank is spaced from the plane of the top surface of said absorber.

7. The flat plate solar energy converter set forth in claim 2 wherein:
   the longitudinal axis of said absorber is substantially perpendicular to the longitudinal axis of said tank.

8. The flat plate solar energy converter set forth in claim 2 wherein:
   said housing and absorber comprises elongated configurations, the longitudinal axis of each being arranged in a substantially parallel arrangement.

9. The flat plate solar energy converter set forth in claim 2 wherein:
   said tank is elevated above said absorber.

10. The flat plate solar energy converter set forth in claim 2 wherein:
    said absorber comprises a flat plate longer than it is wide.

* * * * *